US012803653B2

(12) United States Patent
Kelif

(10) Patent No.: US 12,803,653 B2
(45) Date of Patent: Nov. 17, 2026

(54) METHOD FOR COMMUNICATION BETWEEN A SERVER SATELLITE OF A SATELLITE COMMUNICATION NETWORK AND A USER DEVICE

(71) Applicant: ORANGE, Issy-les-moulineaux (FR)

(72) Inventor: Jean-Marc Kelif, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 320 days.

(21) Appl. No.: 18/572,507

(22) PCT Filed: Jul. 1, 2022

(86) PCT No.: PCT/FR2022/051316

§ 371 (c)(1),
(2) Date: Dec. 20, 2023

(87) PCT Pub. No.: WO2023/275501

PCT Pub. Date: Jan. 5, 2023

(65) Prior Publication Data

US 2024/0291554 A1 Aug. 29, 2024

(30) Foreign Application Priority Data

Jul. 2, 2021 (FR) ...................................... 2107174

(51) Int. Cl.
*H04B 7/185* (2006.01)

(52) U.S. Cl.
CPC ................................ *H04B 7/18513* (2013.01)

(58) Field of Classification Search
CPC ............ H04B 7/18513; H04B 7/18519; H04B 7/18528; H04B 7/18523
See application file for complete search history.

(56) References Cited

U.S. PATENT DOCUMENTS 9,748,989 B1 8/2017 Freedman et al.
2014/0087652 A1* 3/2014 Oh ..................... H04B 7/18513 455/9

(Continued)

FOREIGN PATENT DOCUMENTS

WO 2021023910 A1 2/2021

OTHER PUBLICATIONS

English translation of the Written Opinion of the International Searching Authority dated Oct. 28, 2022 for corresponding International Application No. PCT/FR2022/051316, filed Jul. 1, 2022.

(Continued)

*Primary Examiner* — John J Lee
(74) *Attorney, Agent, or Firm* — David D. Brush; Westman, Champlin & Koehler, P.A.

(57) ABSTRACT

A communication method which includes: determining at least one transmission parameter of a communication on the basis of knowledge of a throughput of the communication according to transmission characteristics of the server satellite and on the basis of a topology of a satellite network in what is known as an interference zone in which satellites likely to interfere with the communication are located; and configuring the server satellite in order to apply the at least one determined transmission parameter during the communication with a user device.

11 Claims, 2 Drawing Sheets

(56) References Cited

U.S. PATENT DOCUMENTS

| | | | | |
|---|---|---|---|---|
| 2017/0188372 A1* | 6/2017 | Reis | ...................... | H04W 4/029 |
| 2019/0045348 A1* | 2/2019 | Li | ...................... | H04B 7/18506 |

OTHER PUBLICATIONS

Gupta Nishant et al., "Green Satellite Communication Link Design, Optimization, and Performance Analysis", 2020 IEEE 7th Uttar Pradesh Section International Conference on Electrical, Electronics and Computer Engineering (UPCON), IEEE, Nov. 27, 2020 (Nov. 27, 2020), p. 1-5, XP033888132.
International Search Report dated Oct. 28, 2022 for corresponding International Application No. PCT/FR2022/051316, filed Jul. 1, 2022.
Written Opinion of the International Searching Authority dated Oct. 28, 2022 for corresponding International Application No. PCT/FR2022/051316, filed Jul. 1, 2022.

* cited by examiner

[Fig 1]
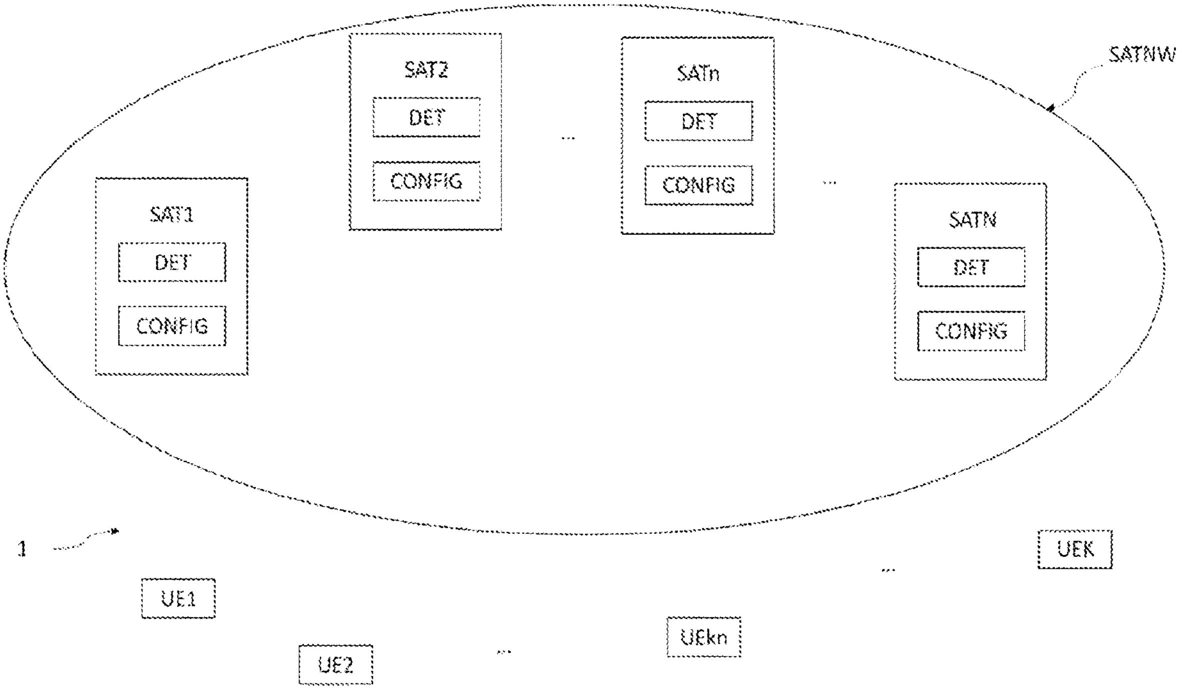
[Fig 2]
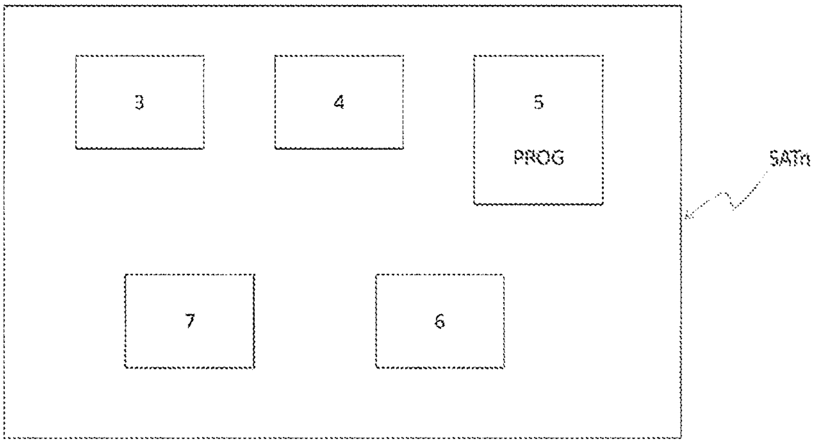

[Fig 3]
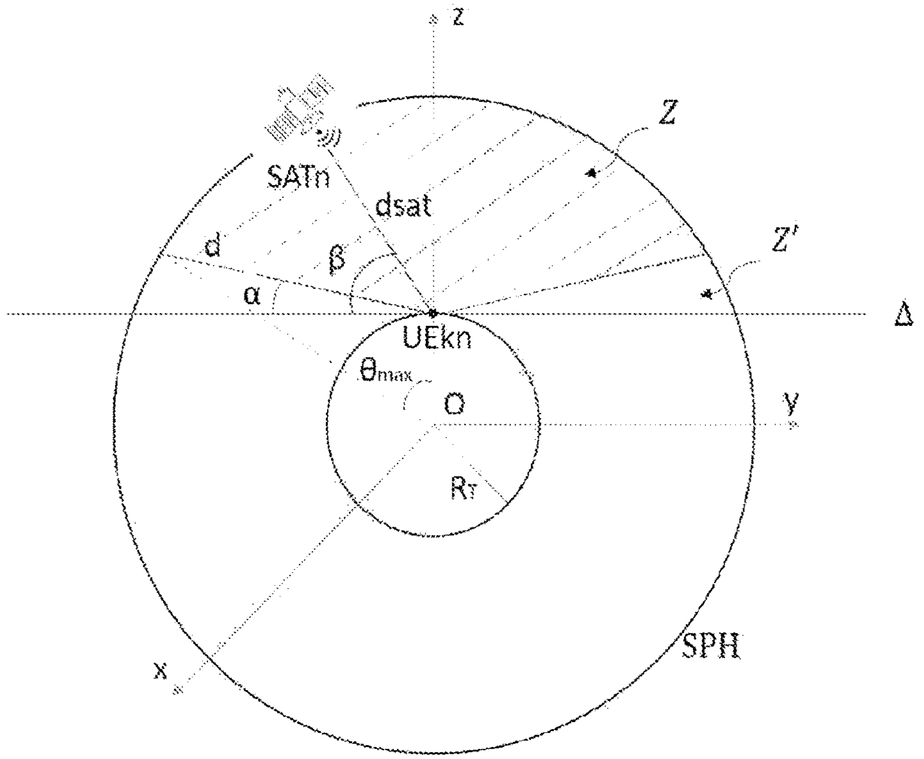
[Fig 4]
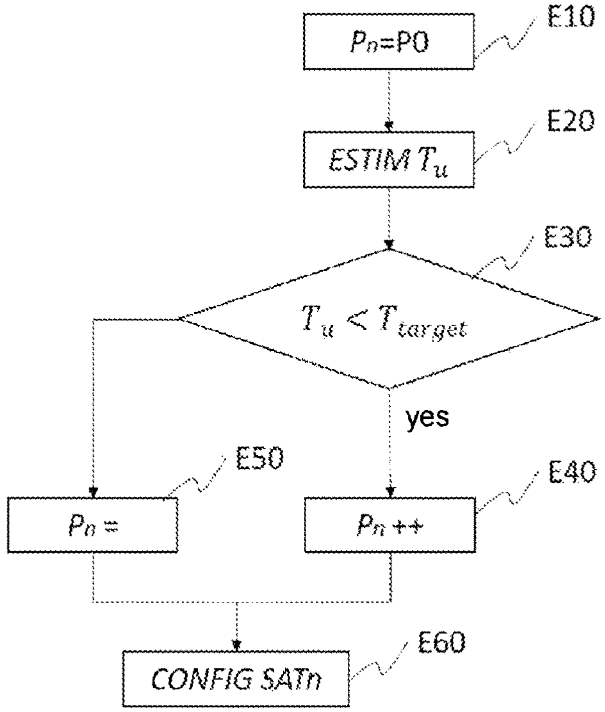

METHOD FOR COMMUNICATION BETWEEN A SERVER SATELLITE OF A SATELLITE COMMUNICATION NETWORK AND A USER DEVICE

CROSS-REFERENCE TO RELATED APPLICATIONS

This application is a Section 371 National Stage Application of International Application No. PCT/FR2022/051316, filed Jul. 1, 2022, which is incorporated by reference in its entirety and published as WO 2023/275501 A1 on Jan. 5, 2023, not in English.

FIELD OF THE DISCLOSURE

The invention relates to the general field of telecommunications. It relates more particularly to a satellite communication network.

The invention is applied preferably, but without limitation, in the context of mobile services relying on a satellite communication network.

BACKGROUND

In a manner known per se, a satellite communication network relies on a plurality of satellites situated in orbit and deployed so as to cover a given geographical zone of the Earth's surface. In order to transmit data to a user equipment of the satellite network, a satellite, referred to as "server satellite", transmits a radio signal to the user equipment with a certain power, referred to as transmission power. It should be noted that the server satellite is the one that covers the geographical zone in which the user equipment is located (for example the user equipment is located in the zone covered by the main lobe of the antenna of the satellite in question) and to which the user equipment is connected or with which the user equipment is associated.

The signal received by the user equipment therefore carries a payload signal the power of which depends on the transmission power applied by the satellite and on characteristics specific to the satellite, such as for example its orbit (which determines in particular its altitude). In addition, this received signal also carries an interference signal generated by the other satellites of the satellite network that transmit simultaneously using the same resources as the server satellite (typically the same frequency).

Each satellite of the satellite network other than the server satellite is liable to generate a signal that interferes with the payload signal transmitted by the server satellite: the interference thus generated depends on the altitude of the satellite in question, on its transmission power and on its relative position with respect to the zone covered by the server satellite. The resulting impact on the performance of the server satellite is non-negligible since all of the satellites of the satellite network transmit simultaneously to a large number of user equipments in the same frequency band.

The document by N. Gupta and S. Bitragunta, entitled "Green Satellite Communication Link Design, Optimization and Performance Analysis", IEEE 7th Uttar Pradesh Section International Conference on Electrical, Electronics and Computer Engineering (UPCON), 2020, pages 1-5, deals with the performance of a satellite communication network in terms of energy efficiency $\varepsilon_\eta$, this being defined as the ratio of spectral efficiency to total power consumed end-to-end by the satellite network, and of outage probability, this being derived from the energy efficiency. More specifically, Gupta et al. define energy efficiency $\varepsilon_\eta$ as follows:

$$\varepsilon_\eta = \frac{\log_2(1 + CNR_{eff})}{P_{tot}}$$

where $CNR_{eff}$ designates the ratio of payload power to thermal noise power taken at a terrestrial radio station, and $P_{tot}$ designates the total end-to-end power consumption of the satellite network.

The impact of various transmission parameters (antenna gain, channel power gain, etc.) on energy efficiency and on outage probability is analyzed by Gupta et al. The possibility of taking interference into account in the calculation of energy efficiency e, in the case of frequency spectrum sharing is also briefly discussed in Gupta et al. However, no indication is given as to the nature of the interference in question or how this is carried out.

Therefore, such an approach does not allow an operator of a satellite network to ensure the performance of its network in the event of simultaneous use of the same resources by several of its satellites, and in particular to ensure that it provides a given quality of service to a user equipment.

SUMMARY

The invention makes it possible in particular to overcome this drawback by proposing a method for communication between a satellite, referred to as server satellite, of a satellite communication network and a user equipment, said method comprising:

- a step of determining at least one transmission parameter of the communication on the basis of knowledge of a throughput of the communication as a function of transmission characteristics of the server satellite and of a topology of the satellite network in what is referred to as an interference zone containing satellites liable to interfere with the communication; and
- a step of configuring the server satellite so as to apply said at least one determined transmission parameter during the communication with the user equipment.

In correlation, the invention also targets a determination device for determining at least one transmission parameter of a communication between a satellite, referred to as server satellite, of a satellite communication network and a user equipment, said device comprising:

- a determination module, parameterized to determine said at least one transmission parameter of the communication on the basis of knowledge of a throughput of the communication as a function of transmission characteristics of the server satellite and of a topology of the satellite network in what is referred to as an interference zone containing satellites liable to interfere with the communication; and
- a configuration module, parameterized to configure the server satellite so as to apply said at least one determined transmission parameter during the communication with the user equipment.

In one particular embodiment, said at least one transmission parameter of the communication is determined during the determination step, respectively said determination module is parameterized to determine said at least one transmission parameter, on the basis of knowledge of the throughput of the communication as a function of a bandwidth allocated to the communication, of a transmission power of the server satellite, of a distance between the server satellite and the user equipment, of a ratio of the antenna gains of the server satellite to said satellites liable to interfere with the communication, and of said topology of the satellite network in said interference zone.

The invention is applicable preferably to a downlink communication, that is to say from the server satellite to the user equipment.

There is no limit attached to the nature of the user equipment. It may be any receiver device, such as for example a fixed or mobile terminal that is a client of the satellite network (for example a smartphone, a computer, etc.), or a terrestrial transmission/reception radio station.

Moreover, the determination device may be integrated into a satellite of the satellite network and in particular into the server satellite, or into a management device for managing the satellite network (for example a ground-based satellite network management center of the operator).

Thus, in one particular embodiment, the invention also targets a satellite of a satellite network comprising a determination device according to the invention for determining at least one transmission parameter of a communication between the satellite and a user equipment.

According to another embodiment, the invention also targets a management device for managing a satellite network comprising a determination device according to the invention for determining at least one transmission parameter of a communication between a satellite, referred to as server satellite, of the satellite network and a user equipment.

The invention therefore proposes to configure a satellite, referred to as server satellite, so as to optimize the performance of a satellite network during downlink communication between the server satellite and a user equipment, taking into account the influence on the throughput of the communication not only of the transmission characteristics of the server satellite (for example transmission power, antenna gain, distance from the user equipment) but also the topology of the satellite network.

Taking into account the topology of the satellite network advantageously makes it possible to characterize the impact on the throughput of the communication under consideration of the other satellites of the satellite network, and in particular of the interference generated thereby on the communication. What is of more particular interest here, according to the invention, is the overall impact of the satellites of the network located in what is referred to as an interference zone in which satellite communications with user equipments of the satellite network are liable to generate interference on the communication of the user equipment with the server satellite if the satellites in question use, at the same time, the same resources (for example same frequency band, same codes, etc.) as the server satellite during the communication with the user equipment. Such an interference zone has for example the shape, when all of the satellites of the network are located at the same altitude (height), of a spherical cap centered on the user equipment, the radius of which is the orbit of the satellites of the satellite network, and delimited taking into account a minimum elevation angle that the satellites require to be liable to interfere with the communication.

The topology of the satellite network in the interference zone is utilized by the invention to model, in a very simple manner, the interference generated on the communication between the server satellite and the user equipment by the other satellites of the satellite network simultaneously using the same resources as the server satellite. More specifically, the invention has no interest in laboriously determining the individual contribution of each satellite of the network to the communication, and then in summing the individual contributions of the satellites, but considers the impact of the satellite network on the communication as a whole by virtue of the knowledge of the topology of the satellite network in the interference zone.

Typically, the topology of the satellite network may comprise a density of satellites of the satellite network that are liable to interfere with the communication in the interference zone, an altitude of the server satellite and/or a minimum elevation angle of the satellites liable to interfere with the communication. As a variant, other elements may be envisaged, such as for example, for each satellite of the satellite network, a probability of this satellite being located in the interference zone and being liable to interfere with the communication (due to its simultaneous use of the same resources as the server satellite).

The satellites present in the interference zone cover a geographical zone intersecting the geographical zone of coverage of the server satellite (in which the user equipment is located) in whole or in part, and are therefore liable to generate overall interference at the user equipment that depends on the density of the satellites using the same resources as the server satellite in this zone.

It should be noted that, if it is desired to maximize the throughput offered by the satellite network, it is necessary to maximize the use of the resources: this results in the satellites using all their resources. In such a configuration, all of the satellites located in the interference zone are liable to interfere with the communication of the server satellite with the user equipment since the probability of these satellites simultaneously using the same resources as the communication tends toward 1. The density of the satellites liable to interfere with the communication and located in the interference zone is therefore equal or substantially equal to the density of the satellites of the satellite network located in the interference zone with the exception of the server satellite. If however the hypothesis that all of the resources are used by the satellites of the satellite network does not apply, it is necessary to consider the density of the satellites located in the interference zone and simultaneously using the same resources as the communication in question.

The overall impact of the satellite network on the communication may then be defined as the integral of the power received by the user equipment from the satellites of the network that are liable to interfere with the communication and located in the interference zone (with the exception of the server satellite). However, through geometric considerations, it is possible, on the basis of this integral, to obtain a very simple expression that depends only on the topology of the satellite network and on the antenna gains and transmission powers of the satellites under consideration.

It should be noted that, among the satellites present in the interference zone, only some are liable to generate non-negligible interference, namely those that are located at a given minimum elevation angle (for example 30°). Thus, in one particular embodiment, it is possible to neglect the impact of satellites located below this minimum elevation angle without otherwise sacrificing the accuracy of the one or more transmission parameters determined according to the invention.

The invention therefore proposes an original and accurate method for evaluating the performance of a satellite network, and more particularly the observed throughput of a communication between a server satellite and a user equipment of the satellite network, and thus to be able to adapt the transmission parameters thereof so as to optimize its performance. More particularly, by virtue of the knowledge of the throughput of the communication on the basis, in one particular embodiment, of the bandwidth allocated to this communication, of the transmission power of the server satellite, of the distance between the server satellite and the user equipment, of the ratio of the antenna gains of the server satellite to satellites liable to interfere with the communication, and of the topology of the satellite network in the interference zone, the invention advantageously makes it possible to select transmission parameters intended to be applied to or by the server satellite that make it possible to guarantee a given quality of service at the user equipment in a real environment (that is to say in the presence of interference).

There is no limit attached to the nature of the transmission parameters in question: these may be for example the transmission power of the server satellite, the throughput of the communication, the bandwidth allocated to the communication, the elevation angle of the server satellite, etc.

The invention may thus be utilized prior to a communication: it then allows the operator of the satellite network to know a priori whether a server satellite satisfies a quality of service required by a user equipment. If it is not possible to determine transmission parameters of the satellite that meet this quality of service, the operator may advantageously anticipate failure of the communication and consider, prior to the communication, various actions aimed at improving user experience: informing the user, rejecting the communication, selecting another satellite to serve the communication, etc.

However, the invention may also be used during communication so as to dynamically adapt one or more transmission parameters of this communication, such as the transmission power of the server satellite, the bandwidth allocated to the communication or the throughput of the communication.

For example, in one particular embodiment, said at least one transmission parameter is the transmission power of the server satellite and the determination step comprises:

- estimating the throughput of the communication for a given transmission power of the satellite, referred to as initial transmission power; and
- if the estimated throughput is less than a determined threshold, increasing said initial transmission power.

In one variant of this embodiment, it is possible to envisage maintaining the initial transmission power if the estimated throughput is greater than or equal to the threshold or reducing the initial transmission power in order to optimize the energy efficiency of the satellite network.

In one particular embodiment, the determination step uses a relationship equivalent to the relationship:

$$T_u = W\log_2\left(1 + \frac{1}{\frac{D\eta\rho Pdsat^2}{P_n} + \frac{N_{th}dsat^2}{KP_nG_n}}\right)$$

where $T_u$ designates the throughput of the communication, W designates the bandwidth allocated to the communication, η designates the ratio of the gains of the antennas of the satellites of the satellite network that are liable to interfere with the communication and are located in the interfering zone to the gain of the antenna of the server satellite, $G_n$ designates the antenna gain of the server satellite, P and Ph designate the respective transmission powers of said satellites liable to interfere with the communication (average power) and of the server satellite, dsat designates the distance between the server satellite and the user equipment, ρ designates the density of the satellites of the satellite network that are liable to interfere with the communication in the interfering zone, and D designates a factor that depends on the altitude of the server satellite, the minimum elevation angle and a radius of the Earth.

This embodiment provides a relationship that is particularity simple to use in the scope of the invention to determine the one or more transmission parameters of the server satellite.

It should be noted that this relationship may also be used to determine other parameters aimed at guaranteeing a given quality of service for the user equipment, such as for example the altitude of the server satellite or its elevation angle with respect to the user equipment, these parameters being able to be utilized by the operator to configure the satellite network or to select an alternative server satellite to serve the user equipment if it is not possible to determine transmission parameters of the server satellite initially under consideration that make it possible to achieve a desired throughput for the communication.

In one particular embodiment of the invention, the collaborative determination method is implemented by a computer.

The invention also targets a computer program on a recording medium, this program being able to be implemented in a computer or more generally in a determination device according to the invention and comprising instructions designed to implement a determination method as described above.

This program may use any programming language and be in the form of source code, object code or intermediate code between source code and object code, such as in a partially compiled form, or in any other desirable form.

The invention also targets a computer-readable information medium or recording medium including instructions of the computer program mentioned above.

The information medium or recording medium may be any entity or device capable of storing the programs. For example, the medium may include a storage means, such as a ROM, for example a CD-ROM or a microelectronic circuit ROM, or else a magnetic recording means, for example a hard disk, or a flash memory.

Moreover, the information medium or recording medium may be a transmissible medium such as an electrical or optical signal, which may be routed via an electrical or optical cable, by radio link, by wireless optical link or by other means.

The program according to the invention may be, in particular, downloaded over the Internet.

As an alternative, the information medium or recording medium may be an integrated circuit in which a program is incorporated, the circuit being designed to execute or to be used in the execution of the collaborative learning method according to the invention.

According to another aspect, the invention also targets a communication system comprising at least one user equipment and a determination device according to the invention configured to determine at least one transmission parameter of a communication between said user equipment and a satellite, referred to as server satellite, of the satellite communication network.

It should be noted that it is possible, in other embodiments, to envisage the determination method, the determination device and the communication system according to the invention having all or some of the abovementioned features in combination.

BRIEF DESCRIPTION OF THE DRAWINGS

Other features and advantages of the present invention will emerge from the description given below, with reference to the appended drawings which illustrate an exemplary embodiment thereof that is in no way limiting. In the figures:

FIG. 1 shows a communication system according to the invention in one particular embodiment;

FIG. 2 shows one example of the hardware architecture of a satellite hosting a determination device according to the invention, in one particular embodiment;

FIG. 3 shows an interference zone under consideration for a communication between a satellite SATn and a user equipment UEkn;

FIG. 4 illustrates, in the form of a flowchart, the main steps of a determination method according to the invention, in one particular embodiment.

DETAILED DESCRIPTION OF ILLUSTRATIVE EMBODIMENTS

FIG. 1 shows, in its environment, a communication system 1 according to the invention, in one particular embodiment.

The communication system 1 comprises at least one user equipment UE1, UE2, . . . UEK, K designating an integer greater than or equal to 1, of a satellite communication network SATNW relying on a plurality of satellites SAT1, SAT2, . . . , SATN, N designating an integer greater than 1. The user equipments UE1, . . . , UEK are located here on the surface of the Earth. The satellites SAT1, . . . , SATN are for example satellites all located in the same orbit, at an altitude h with respect to the Earth's surface. By way of illustration, this altitude h is typically greater than 300 km for low-orbit satellites, and is of the order of 36000 km for geostationary satellites.

It should be noted however that the invention is not limited to satellites all located at the same altitude (height). The invention may be applied to other satellite configurations (for example multiple orbits located at different altitudes).

In the embodiment described here, each satellite SATn, n=1, . . . , N houses an on-board determination device 2 according to the invention. This determination device 2 is configured to determine at least one transmission parameter of an (established or future) communication between the satellite SATn on board which it is housed, n being an integer between 1 and N, and a user equipment UEkn located on the surface of the Earth, kn being an integer between 1 and K, located in the zone of coverage of the satellite SATn and connected thereto. It is then said that the satellite SATn is a server satellite for the user equipment UEkn; in other words, it transmits and receives data destined for and coming from the user equipment UEkn and transiting via the satellite network SATNW. What are of interest here are the downlink communications, that is to say from the server satellite to the user equipment.

It should be noted that there is no limit attached to the nature of the user equipments UE1, . . . , UEK. In the example envisaged here, these user equipments are mobile terminals, such as for example smartphones or laptop computers. However, as a variant, they may be fixed terminals, terrestrial transmission/reception stations, etc.

In the embodiment described here, each determination device 2 according to the invention relies on the hardware architecture of the physical equipment on board which it is housed, namely here the satellite SATn on board which it is housed. This hardware architecture is shown schematically in FIG. 2. It comprises in particular a processor 3, a random access memory 4, a read-only memory 5, a non-volatile memory 6 and communication means 7 that allow the satellite SATn to communicate with the user equipments of the satellite network located within its coverage and, where applicable, with a management center or device for managing the satellite network (not shown in FIG. 1).

The read-only memory 5 is an information medium on which there is recorded a computer program PROG, able to be read by the processor 3 and comprising instructions for executing a determination method according to the invention.

The program PROG defines functional modules of the determination device 2 according to the invention housed on board the satellite SATn that relies on or controls the hardware elements 3 to 7 outlined above. In the embodiment described here, these modules comprise in particular, as illustrated in FIG. 1:

- a determination module DET, parameterized (that is to say configured) to determine at least one transmission parameter of a communication with a user equipment (for example the user equipment UEkn in the example envisaged above) located in the coverage of the satellite SATn housing the determination device 2 on board and for which the satellite SATn is a server satellite. The module DET is configured to determine the one or more transmission parameters in question on the basis of knowledge it possesses about a throughput of the communication as a function of a bandwidth W allocated to this communication, of a transmission power Ph of the satellite SATn (and possibly of the satellites liable to interfere with the communication if all of the satellites of the satellite network do not use the same transmission power), of a distance dsat between the satellite SATn and the user equipment under consideration (for example UEkn in the example envisaged here), of a ratio of the antenna gains of the satellites of the satellite network SATNW that are liable to interfere with the communication to the satellite SATn and of a topology of the satellite network SATNW in what is referred to as an interference zone, referenced Z, containing said satellites liable to interfere with the communication. It should be noted that the satellites liable to interfere with the communication are satellites that use, as the same time as the communication, the same resources that the satellite SATn uses on the downlink to communicate with the user equipment UEkn, for example the same frequency band, the same codes, etc. depending on the multiple access technique under consideration; and
- a configuration module CONFIG, parameterized to configure the satellite SATn such that it applies the one or more transmission parameters determined by the module DET during the communication with the user equipment under consideration (for example UEkn in the example envisaged here).

Various transmission parameters may be determined by the determination device 2 integrated into a satellite SATn, n=1, . . . , N, these parameters being able to differ from one satellite to another depending on the flexibility that the operator wishes to have. Thus, for example, the determination device 2 may be interested in determining the transmission power applied by the satellite SATn during the communication, or the throughput of the communication, or else the bandwidth allocated to the communication or else an elevation angle of the satellite SATn during the communication, etc.

A description will now be given, with reference to FIGS. 3 and 4, of how one (or more) transmission parameter(s) is (are) determined by the determination device 2 according to the invention. As mentioned above, according to the invention, the one or more transmission parameters are determined by the determination device 2 on the basis of knowledge of a throughput of the communication as a function of transmission characteristics of the server satellite and of a topology of the satellite network in an interference zone containing satellites liable to interfere with the communication.

By way of illustration, what is of more particular interest here is the downlink communication between the satellite SATn and the user equipment UEkn, which is assumed to be located in the zone of coverage of the satellite SATn (in other words, in the zone covered by the main lobe of the antenna of the satellite SATn) and connected to the satellite SATn in order to receive and/or transmit data during the communication. It should be noted that this determination may be carried out prior to the communication, typically in anticipation of this communication, allowing the operator of the satellite network SATNW to anticipate the parameters to be applied during future communications in order to ensure that a given quality of service is provided to its users (for example a given target throughput), or as a variant during a communication, thus allowing the operator to dynamically adapt the transmission parameters applied by the satellite to achieve a given quality of service (for example a communication throughput). As mentioned above, the invention may also be used by the operator of the satellite network to determine other parameters aimed at guaranteeing a given quality of service for a user equipment and to parameterize its satellite network accordingly, such as for example the altitude of the server satellite (before it is put into orbit) or its elevation angle with respect to the user equipment, the parameters being able to be utilized by the operator to configure the satellite network or to select another server satellite to serve the user equipment.

By way of illustration, the remainder of the description adopts the second scenario (dynamic adaptation of the transmission parameter of a communication in progress), and it will be assumed that the transmission parameter that it is desired to determine (and possibly adapt) is the transmission power, denoted $P_n$, of the satellite SATn.

As mentioned above, in the embodiment described here, to determine the transmission power (or a transmission parameter of the communication in general), the determination device 2 relies on knowledge of the throughput of the communication as a function of the bandwidth W allocated to this communication, of the transmission power $P_n$ of the server satellite SATn (and possibly the average transmission power P of the other satellites of the satellite network), of the distance dsat between the server satellite SATn and the user equipment UEkn, of the ratio of the antenna gains of the server satellite SATn to the satellites of the satellite network SATNW that are liable to interfere with the communication, and of the topology of the satellite network SATNW in the interference zone Z containing said satellites liable to interfere with the communication.

FIG. 3 shows the interference zone Z (in hatched lines) under consideration in the embodiment described here. It is a spherical cap corresponding to a portion of the sphere SPH the radius of which is the orbit of the satellites SAT1, . . . , SATN of the satellite network SATNW.

More specifically, the satellites of the satellite network SATNW that use, at the same time as the communication, the same resources that the satellite SATn uses to communicate on the downlink with the user equipment UEkn, such as for example the same frequency band, are considered to be liable to generate interference on the communication between the satellite SATn and the user equipment UEkn. It will be hypothesized here that all of the satellites of the satellite network SATNW in the line of sight of the user equipment UEkn satisfy this condition for the sake of simplification, that is to say the satellites located in the sphere portion Z' (also interference zone within the meaning of the invention) of the sphere SPH delimited by the horizontal plane Δ orthogonal to the radius $R_T$ of the Earth at a point where the user equipment UEkn is located (that is to say tangent to the Earth at the user equipment UEkn). It should be noted that this hypothesis is realistic because, in such a satellite network, a priori all of the satellites of the network are used to transmit data to users of the satellite network and configured to utilize all of the resources that it possesses in order to maximize the performance of the network. This means that the simultaneous use of the same resources by all of the satellites of the satellite network is a hypothesis that a satellite network satisfies with a high probability.

If this hypothesis is not satisfied for the satellite network under consideration, it is sufficient to limit the study to satellites located in the sphere portion Z' simultaneously using the same resources that the server satellite SATn uses on the downlink to communicate with the user equipment UEkn.

Moreover, the inventor has found that, below a certain elevation angle with respect to the user equipment UEkn, denoted α, typically $\alpha=30°$, the interference generated by satellites located in the zone Z' has only a small impact on the performance of the communication between the satellite SATn and the user equipment UEkn and may be neglected, and so, in the remainder of the description, consideration will be given to an interference zone Z corresponding to the spherical cap delimited by the disk parallel to the plane Δ corresponding to an elevation angle with respect to the user equipment UEkn equal to α. It should be noted that the value 30° is a typical value provided by satellite manufacturers, but the invention is applicable to other values of α (for example to values less than 30°).

Ingeniously, the inventor evaluated the interference generated by all of the satellites liable to interfere with the communication of the satellite SATn with the user equipment UEkn and located in the zone Z thus defined on a global basis (rather than individually for each satellite). To this end, they considered the topology of the satellite network SATNW in this zone Z and, more specifically, in the embodiment described here, the density ρ of the satellites liable to interfere with the communication and located in the interference zone Z (that is to say number of satellites per unit area), the altitude h of the satellites and more particularly of the server satellite SATn, as well as the minimum elevation angle α of the satellites liable to interfere with the communication and located in the interference zone Z (namely here $\alpha=300$).

As a variant, it is possible to consider other elements representative of the topology of the satellite network, such as for example the probability of a satellite generating interference affecting the communication between the satellite SATn and the user equipment UEkn, in other words the probability of the satellite in question being located in the interference zone Z or Z'.

More specifically, the inventor advantageously modeled the overall impact $I_Z$ of the satellites, in other words the overall interference generated thereby, on the communication between the satellite SATn and the user equipment UEkn as the (double) integral over the interference zone Z of the power received by the user equipment UEkn during the communication from all of the satellites located in the zone Z, except for the satellite SATn, that is to say:

$$I_Z \approx \iint_Z \frac{KPG\rho}{d^2} r^2 \sin\theta d\theta d\varphi$$

where K designates the propagation constant, known per se, P designates the average transmission power of the satellites liable to interfere with the communication and located in the interference zone Z, ρ designates the density of these satellites, G designates the gain of the antennas of these satellites in the direction of the user equipment UEkn and d designates the distance separating the user equipment UEkn from a satellite of the zone Z having an elevation angle with respect to the user equipment UEkn equal to the minimum elevation angle α. The angles θ and φ represent the standard angles of a satellite of the satellite network belonging to the interference zone Z in a spherical reference frame that is known per se, not shown in FIG. 3 for the sake of simplification (θ is defined with respect to the vertical axis (Oz), O designating the center of the Earth, φ is defined in the plane (xOy) and r is the distance separating the satellite under consideration from the center of the Earth, that is to say $r^2=(R_T+h)^2$, where $R_T$ designates the radius of the Earth ($R_T$=6371 km) and h designates the altitude of the satellites (common to all of the satellites in the example envisaged here).

In this relationship, the inventor made the (realistic and highly probable) hypothesis that the gain ratio G and the power P are the same for all of the satellites liable to interfere with the communication and located in the zone Z: indeed, since the user equipment UEkn is not within the coverage of the main lobe of the radiation pattern of the antennas of these satellites (which would otherwise be server satellites for the user equipment UEkn), it is common to consider (cf. technical specifications of satellite networks) that the same gain applies in the direction of the user equipment UEKn outside this main lobe, for example −30 dB with respect to the maximum gain of the main lobe of the antenna of the satellite SATn. Furthermore, to maximize the throughput able to be achieved during a communication, it is conventional to configure (all of) the satellites such that they transmit with the maximum authorized power Pmax (P=Pmax). Taking the hypothesis that a different transmission power is used by the satellites of the satellite network, the expression of $I_Z$ given above models the impact of the satellites on the communication between the satellite SATn and the user equipment UEkn well, as long as P then designates the average transmission power of the satellites.

The expression of $I_Z$ may therefore be written under these hypotheses:

$$I_Z = KPG\rho \iint_Z \frac{(R_T+h)^2}{d^2} \sin\theta d\theta d\varphi$$

-continued

By stating:

$$D = \iint_Z \frac{(R_T+h)^2}{d^2} \sin\theta d\theta d\varphi$$

it is possible to show, through geometric considerations, that:

$$d = -R_T \sin\alpha + \sqrt{R_T h (R_T + \sin\alpha)^2 + h^2}$$

and $$D = \frac{\pi(R_T+h)}{R_T} \log\frac{A}{B}$$

with:

$$A = (R_T+h)^2 + R_T^2 - 2R_T(R_T+h)\left(\frac{R_T + d\sin\alpha}{R_T+h}\right)$$

$$B = (R_T+h)^2 + R_T^2 - 2R_T(R_T+h)$$

As a result:

$$\frac{A}{B} = \frac{2R_T(h - d\sin\alpha)}{h^2} + 1$$

It should be noted that, if the satellites of the satellite network have different altitudes, the same reasoning applies to each subset of satellites located at the same altitude, the overall contribution of the satellites being obtained by summing the contributions of each subset for each different altitude (a distinct density is then considered for each different altitude).

Moreover, the maximum throughput $T_u$ of the communication between the satellite SATn and the user equipment UEkn on the downlink is given by the capacity of the channel separating the satellite SATn and the user equipment UEkn, that is to say, as is known:

$$T_u = W\log_2\left(1 + \frac{\frac{KP_nG_n}{dsat^2}}{I_Z + N_{th}}\right)$$

where W designates the bandwidth allocated to the communication, $P_n$ designates the transmission power of the satellite SATn during the communicating to the user equipment UEkn, $G_n$ designates the gain of the antenna of the satellite SATn in the direction of the user equipment UEkn, dsat designates the distance separating the satellite SATn from the user equipment UEkn, and $N_{th}$ designates the variance of thermal noise at the user equipment UEkn that is assumed to be known to the satellite SATn (obtained either through a calculation known to those skilled in the art or received from the user equipment UEkn). In other words, replacing the value of $I_Z$, in this expression gives:

$$T_u = W\log_2\left(1 + \frac{1}{\frac{D\eta\rho P dsat^2}{P_n} + \frac{N_{th} dsat^2}{KP_nG_n}}\right) \tag{1}$$

where η designates the ratio of the antenna gains G and $G_n$ ($\eta=G/G_n$), and with:

$$dsat=-R_T\sin\beta+\sqrt{R_Th(R_T+\sin\beta)^2+h^2}$$

β designating the elevation angle of the satellite SATn with respect to the user equipment UEkn, this angle corresponding to the angle made by the straight line connecting the user equipment UEkn to the server satellite SATn with respect to the plane Δ tangent to the Earth at the user equipment UEkn. It should be noted that the angle β depends on the position of the satellite SATn in its orbit, which is known to the operator of the satellite network SATNW, and which may be transmitted thereby (for example via the management center for managing the satellite network) to the satellite to allow it to calculate the angle β on the basis of its own position and that of the user equipment UEkn. Moreover, in equation (1), P designates the average power of the interfering satellites, known to the operator of the satellite network, and which may be provided thereby to the satellite SATn.

The density ρ is equal to the ratio of the number Nsat of satellites liable to interfere with the communication and located in the interference zone Z to the area S of the interference zone Z.

The number Nsat is a datum that is known to the operator of the satellite network SATNW and provided thereby (for example via the management center for managing the satellite network) to the determination device 2.

The area S of the interference zone Z may be easily obtained via geometric considerations from the following relationship:

$$S=2\pi(R_T+h)(1-\cos\theta_{max})$$

with:

$$\cos\theta_{max}=\frac{R_T+d\sin\alpha}{R_T+h}$$

($\theta_{max}$ is shown in FIG. 3 for ease of understanding).

Thus, by applying expression (1) as well as the previous relationships giving the various quantities involved in equation (1), the determination module DET has knowledge of the throughput $T_u$ of the communication between the satellite SATn and the user equipment UEkn. It should be noted that, in equation (1), the values of G and Gn are known to the determination device 2 from the radiation patterns of the antennas used by the satellites, $R_T$ is a predetermined constant known to a person skilled in the art, α here is a constant taken to be equal to 30° and h is set by the operator of the satellite network SATNW when the latter is deployed.

A description will now be given, with reference to FIG. 4, of how the determination device 2 of the satellite SATn utilizes this knowledge to determine the power $P_n$ to be used during the communication, in one particular embodiment. As mentioned above, the case is considered by way of illustration in which the power $P_n$ is adapted dynamically by the determination device 2 as a function of a target throughput value $T_{target}$ that the operator wishes to guarantee to the user equipment UEkn during the communication.

Before any adaptation, the transmission power $P_n$ of the satellite SATn is set to an initial value P0, that is to say $P_n$=P0 (step E10).

Next, the determination module DET of the determination device 2 estimates the throughput $T_u$ of the communication with the user equipment UEkn taking into account this initial transmission power P0 applied by the satellite SATn during the sending of data to the user equipment UEkn (step E20).

To this end, in the embodiment described here, the determination module DET uses the following expression (1) introduced above.

The determination module DET then compares the estimated value $T_u$ of the throughput with the target value $T_{target}$ (test step E30).

If $T_u<T_{target}$ (answer yes to test step E30), the configuration module CONFIG increases the transmission power $P_n$ of the satellite SATn (step E40).

Otherwise (answer no to test step E30), in the embodiment described here, it keeps the power $P_n$ at its current value (for example P0 in the example envisaged here) (step E50).

As a variant, if the estimated value $T_u$ of the throughput exceeds the target value $T_{target}$ by a predetermined threshold THR, then the configuration module CONFIG reduces the transmission power $P_n$ of the satellite SATn in order to optimize the energy efficiency of the satellite network.

The increase (respectively the decrease) in the transmission power $P_n$ of the satellite SATn may be brought about in various ways.

In a first variant embodiment, the configuration module CONFIG may add or subtract a predetermined quantity δP to or from the power $P_n$.

In a second variant embodiment, the configuration module CONFIG may use expression (1) to determine the quantity by which to increase or reduce the power $P_n$ of the satellite SATn, by seeking the quantity δP such that $T_u=T_{target}$ or is as close as possible to $T_{target}$ in order to optimize the energy efficiency of the satellite network. Such an equation solution, knowing expression (1), is easily able to be implemented numerically (for example by dichotomy or using another equation-solving algorithm) and would not pose any problem per se to a person skilled in the art.

The configuration module CONFIG then configures the transmitter of the satellite SATn such that it uses the transmission power $P_n$ (step E60).

As mentioned above, in another embodiment, the determination method according to the invention may be implemented in order to determine a priori, prior to the communication with the user equipment UEkn, the transmission power $P_n$ to be applied during this communication in order to achieve a target throughput value $T_{target}$. For this purpose, the determination module DET looks for the value of $T_u=T_{target}$ that makes it possible to solve the equation $T_u=T_{target}$ using relationship (1), for example numerically as outlined above.

Moreover, in the embodiment described here, what was of interest was determining the transmission power $P_n$ of the satellite SATn. In another embodiment, it is possible to envisage determining another transmission parameter applied by the satellite SATn, appearing in relationship (1) or able to be determined from a parameter appearing in relationship (1), such as for example the transmission throughput, the bandwidth allocated to the communication, the elevation angle of the satellite SATn, etc. In these other embodiments, if the same transmission power is used by all of the satellites including the server satellite, then P=Pn, thereby making it possible to further simplify relationship (1).

Furthermore, in the embodiment described here, the determination device 2 is housed on board each satellite of the satellite network. In another embodiment, the determination device 2 may be housed in a management center or device for managing the satellite network, located for example on the ground. The management center or device then transmits, to the satellite SATn, the transmission power or more generally the transmission parameter that it has determined, so that said satellite applies it during its communication with the user equipment UEkn (configuration within the meaning of the invention).

Of course, what has just been described for the satellite SATn and the user equipment UEkn applies identically or similarly to the other satellites and to the user equipments served thereby.

It should be noted that, in addition to determining transmission parameters, relationship (1) may advantageously be used to predict and quantify the impact of orbital characteristics of the server satellite (altitude, elevation angle, etc.).

The invention may be applied for example to a satellite mobile telephony network. It may be applied in particular to cellular systems based on an OFDMA (orthogonal frequency division multiple access) access technology, such as LTE-A and 5G systems defined by the 3GPP standard. However, the invention may also be applied to other non-cellular satellite systems.

The invention claimed is:

1. A communication method for communication between a server satellite of a satellite communication network and a user equipment, said method being implemented by a determination device and comprising:
- determining at least one transmission parameter of the communication on the basis of knowledge of a throughput of the communication as a function of transmission characteristics of the server satellite and of a topology of the satellite network in an interference zone containing satellites liable to interfere with the communication, wherein said at least one transmission parameter is a transmission power of the server satellite and the determining comprises:
  - estimating the throughput of the communication for a given transmission power of the server satellite, referred to as initial transmission power; and
  - if the estimated throughput is less than a determined threshold, increasing said initial transmission power; and
- configuring the server satellite so as to apply said at least one determined transmission parameter during the communication with the user equipment.

2. The communication method as claimed in claim 1, wherein, during the determining, said at least one transmission parameter of the communication is determined on the basis of knowledge of the throughput of the communication as a function of a bandwidth allocated to this communication, of a transmission power of the server satellite, of a distance between the server satellite and the user equipment, of a ratio of antenna gains of the server satellite to said satellites liable to interfere with the communication, and of said topology of the satellite network in said interference zone.

3. The communication method as claimed in claim 1, wherein said at least one transmission parameter, further comprises at least one of the throughput of the communication or a bandwidth allocated to the communication.

4. The communication method as claimed in claim 1, wherein the topology of the satellite network comprises at least one element from among a density of the satellites liable to interfere with the communication of the satellite network in said interference zone, an altitude of the server satellite, a minimum elevation angle of the satellites liable to interfere with the communication, and/or a probability of a satellite being located in said interference zone and being liable to interfere with the communication.

5. The communication method as claimed in claim 4, wherein the determining uses a relationship equivalent to the relationship:

$$T_u = W\log_2\left(1 + \frac{1}{\frac{D\eta\rho P dsat^2}{P_n} + \frac{N_{th} dsat^2}{KP_nG_n}}\right)$$

where $T_u$ designates the throughput of the communication, W designates a bandwidth allocated to the communication, η designates a ratio of gains of antennas of the satellites of the satellite network that are liable to interfere with the communication and located in the interfering zone to a gain of an antenna of the server satellite, $G_n$ designates a gain of the server satellite, P and $P_n$ designate respective transmission powers of the satellites liable to interfere with the communication of the satellite network in the interfering zone and of the server satellite, dsat designates a distance between the server satellite and the user equipment, ρ designates a density of the satellites liable to interfere with the communication of the satellite network in the interfering zone, and D designates a factor that depends on an altitude of the server satellite, a minimum elevation angle and a radius of the Earth.

6. A non-transitory computer readable recording medium on which there is recorded a computer program for implementing a method for communication between a server satellite of a satellite communication network and a user equipment when the instructions are executed by a processor of a determining device, wherein the method comprises:
- determining at least one transmission parameter of the communication on the basis of knowledge of a throughput of the communication as a function of transmission characteristics of the server satellite and of a topology of the satellite network in an interference zone containing satellites liable to interfere with the communication, wherein said at least one transmission parameter is a transmission power of the server satellite and the determining comprises:
  - estimating the throughput of the communication for a given transmission power of the server satellite, referred to as initial transmission power; and
  - if the estimated throughput is less than a determined threshold, increasing said initial transmission power; and
- configuring the server satellite so as to apply said at least one determined transmission parameter during the communication with the user equipment.

7. A determination device for determining at least one transmission parameter of a communication between a server satellite of a satellite communication network and a user equipment, said device comprising:
- at least one processor; and
- at least one non-transitory computer readable medium comprising instructions stored thereon which when executed by the at least one processor configure the determination device to:
- determine said at least one transmission parameter of the communication on the basis of knowledge of a throughput of the communication as a function of transmission characteristics of the server satellite and of a topology of the satellite network in an interference zone containing satellites liable to interfere with the communication, wherein said at least one transmission parameter is a transmission power of the server satellite and the determining comprises:

estimating the throughput of the communication for a given transmission power of the server satellite, referred to as initial transmission power; and if the estimated throughput is less than a determined threshold, increasing said initial transmission power; and configure the server satellite so as to apply said at least one determined transmission parameter during the communication with the user equipment.

8. The determination device as claimed in claim 7, wherein the instructions parameterize the at least one processor to determine said at least one transmission parameter of the communication on the basis of knowledge of the throughput of the communication as a function of a bandwidth allocated to this communication, of the transmission power of the server satellite, of a distance between the server satellite and the user equipment, of a ratio of antenna gains of the server satellite to said satellites liable to interfere with the communication, and of said topology of the satellite network in said interference zone.

9. A satellite of the satellite network comprising the determination device as claimed in claim 7.

10. A management device for managing the satellite network comprising the determination device as claimed in claim 7.

11. A communication system comprising the user equipment of the satellite communication network and the determination device as claimed in claim 7 configured to determine the at least one transmission parameter of the communication between said user equipment and the server satellite.

* * * * *